United States Patent
Xu et al.

(10) Patent No.: US 10,483,802 B2
(45) Date of Patent: Nov. 19, 2019

(54) PEAK VOLTAGE DETECTION IN A DIFFERENTIALLY DRIVEN WIRELESS RESONANT TRANSMITTER

(71) Applicant: Texas Instruments Incorporated, Dallas, TX (US)

(72) Inventors: Jingwei Xu, Plano, TX (US); Vijayalakshmi Devarajan, Plano, TX (US); Lindsay Langford, Austin, TX (US)

(73) Assignee: Texas Instruments Incorporated, Dallas, TX (US)

( * ) Notice: Subject to any disclaimer, the term of this patent is extended or adjusted under 35 U.S.C. 154(b) by 5 days.

(21) Appl. No.: 15/458,195

(22) Filed: Mar. 14, 2017

(65) Prior Publication Data

US 2018/0269722 A1    Sep. 20, 2018

(51) Int. Cl.
*H02J 50/12* (2016.01)
*H02M 3/04* (2006.01)
*H02J 7/02* (2016.01)

(52) U.S. Cl.
CPC .............. *H02J 50/12* (2016.02); *H02M 3/04* (2013.01); *H02J 7/025* (2013.01)

(58) Field of Classification Search
CPC .. H02J 50/12; H02J 50/80; H02J 5/005; H02J 7/025; H02J 17/00; H02M 3/04

USPC ......................................................... 307/104
See application file for complete search history.

(56) References Cited

U.S. PATENT DOCUMENTS

| | | | |
|---|---|---|---|
| 2014/0132210 A1 | 5/2014 | Partovi | |
| 2015/0357832 A1* | 12/2015 | Tseng | H04B 5/0037 307/104 |

OTHER PUBLICATIONS

Tsai-Pi Hung, et al., "H-Bridge Class-D Power Amplifiers for Digital Pulse Modulation Transmitters", Microwave Symposium, IEEE/MTT-S International, Jun. 3-8, 2007, pp. 1-4.

* cited by examiner

*Primary Examiner* — Carlos Amaya
(74) *Attorney, Agent, or Firm* — Lawrence J. Bassuk; Charles A. Brill; Frank D. Cimino

(57) ABSTRACT

A wireless resonant power transmitter includes a first half-bridge and a second half-bridge adapted to be class D driven that are coupled to drive a series resonant circuit including a primary inductor (L) having a high side terminal and a low side terminal, and primary capacitor (C). A peak voltage sensor that includes a summing block is coupled across the high side terminal and the low side terminal of the primary L, and a peak-to-peak voltage detector is coupled to an output of the summing block to generate a DC voltage signal that is proportional to a peak-to-peak voltage across the primary C.

18 Claims, 7 Drawing Sheets

PEAK VOLTAGE DETECTION IN A DIFFERENTIALLY DRIVEN WIRELESS RESONANT TRANSMITTER

FIELD

Disclosed embodiments relate to dynamic peak voltage detection for differentially driven wireless power transmitters.

BACKGROUND

Magnetic resonance power technology is the near-field wireless transmission of electrical energy between a transmitter coil and a receiver coil that are tuned to resonate at the same frequency. Based on the principles of electromagnetic coupling, resonance-based chargers inject an oscillating current into a highly resonant coil to create an oscillating electromagnetic field. A receive coil with the same resonant frequency located close by receives power from the electromagnetic field and converts it back into electrical current that can be used to power and charge a portable device. Resonance charging offers unique advantages in spatial freedom, enabling the transmitter (resonance charger) to be separated from the receiver (portable device) by up to several inches or more.

Knowledge of the peak-to-peak voltage across the resonant transmitter's primary inductor L or primary capacitor C during power transfer is needed for high frequency resonant power management systems. A conventional method to measure the peak-to-peak voltage during operation of the resonant transmitter is to use a fast differential amplifier with high common mode rejection to process the signal which is generally at a high frequency, such as being driven by a class-D driver switched at the US Federal Communication Commission (FCC) allowed frequency of 6.78 MHz. The peak-to-peak voltage across the capacitor C is generally easiest to measure compared to the peak-to-peak voltage across the primary L which can also technically be used for this purpose, but is complicated by step jumps resulting from the driver's pulsed drive signals.

SUMMARY

This Summary briefly indicates the nature and substance of this Disclosure. It is submitted with the understanding that it will not be used to interpret or limit the scope or meaning of the claims.

Disclosed embodiments recognize knowledge of the peak-to-peak voltage across the primary L or across the primary C of a wireless series resonant LC power transmitter is important to provide to the DC/DC controller for high frequency power management systems to achieve better charging system control. Since the amount of stored energy (or power; equal to the work done in establishing the electric field) in a resonant series LC or RLC circuit can be expressed as $CV^2/2$ (the energy across the capacitor) or $LI^2/2$ (the energy stored in the magnetic field generated by the current flowing through the inductor), the peak-to-peak voltage can be converted into the stored energy if needed.

As known in the art, a class-D amplifier or switching amplifier is an electronic amplifier in which the amplifying devices (transistors, usually metal-oxide-semiconductor field-effect transistors (MOSFETs)) operate as electronic switches, not as linear gain devices as in other amplifiers. The signal to be amplified is a train of constant amplitude pulses, so that the active (generally MOSFET) devices switch rapidly back and forth between a fully conductive on state and non-conductive off state. For a single half-bridge driver switching at a high frequency, such as switching at 6.78 MHz driving a series resonant LC power transmitter, one can relatively easily measure the peak-to-peak voltage across the primary C relative to ground.

However, for a higher power series resonant LC power transmitter arrangement comprising a differential class-D configuration, such as with the half-bridges operating at 6.78 MHz, there are sudden voltage jumps at every circuit node in the resonant circuit. The peak-to-peak voltage across the terminals of the primary L contains a step jump when the LC resonance circuit is driven in a differential class-D configuration. The differential voltage across the terminals of the primary C is continuous unlike that across the terminals of the primary L, but because the LC resonant circuit is driven by differential half-bridges, there is a high frequency (e.g., 6.78 MHz) common mode voltage jump so that the voltage at both ends of the primary C swings widely. A high bandwidth differential amplifier with good common mode rejection needed for this peak-to-peak voltage measurement across primary C is difficult to design and will consume high power in operation.

Disclosed embodiments include a methodology and circuitry that generates a DC voltage signal that is proportional to a peak-to-peak voltage across the primary C from signal processing an output of a summing block coupled across the terminals of the primary L of the LC resonant circuit driven in a differential class-D configuration. Although there is a step jump across the primary L when the LC resonant circuit is driven in a differential class-D configuration, and the voltage across the primary C has a significant level of common mode noise, it has been found disclosed summation of the peak-to-peak voltage across the primary L using a summing block has neither a voltage jump nor the common mode noise. This arrangement enables generating a relatively clean DC voltage signal that is proportional to a peak-to-peak voltage across the primary C.

It can be shown that when the duty cycle of class-D driver driving the resonant series LC circuit is running at 50%, the summation voltage across the primary L is equal to the voltage across the primary C plus 50% of the class-D supply voltage. The supply voltage to the half-bridges is generally provided by the DC-DC controller.

Additional gain and common mode (CM) control can be achieved with the summing block comprising a first and a second series connected resistor having a center node positioned in parallel to the primary L having its center node connected to a relatively low DC voltage level that is set at the CM voltage. The center node can be coupled to envelope generators comprising a sample and hold circuit for relatively easy signal processing. The sample/hold circuits can be used to extract a peak and valley envelope and a differential to single ended amplifier. The envelope generators embodied as sample/hold circuits only need a reasonably fast comparator, which consumes significantly lower power than a conventional fast differential amplifier, which can also generally easily follow the envelop of the peak and valley voltage, which changes relatively slowly. The downstream amplifier can be low power for the needed low speed signal processing.

BRIEF DESCRIPTION OF THE DRAWINGS

Reference will now be made to the accompanying drawings, which are not necessarily drawn to scale, wherein:

FIG. 4B shows voltage waveform data where the optional filter capacitor was 2 pF, while

DETAILED DESCRIPTION

Figure 1A:
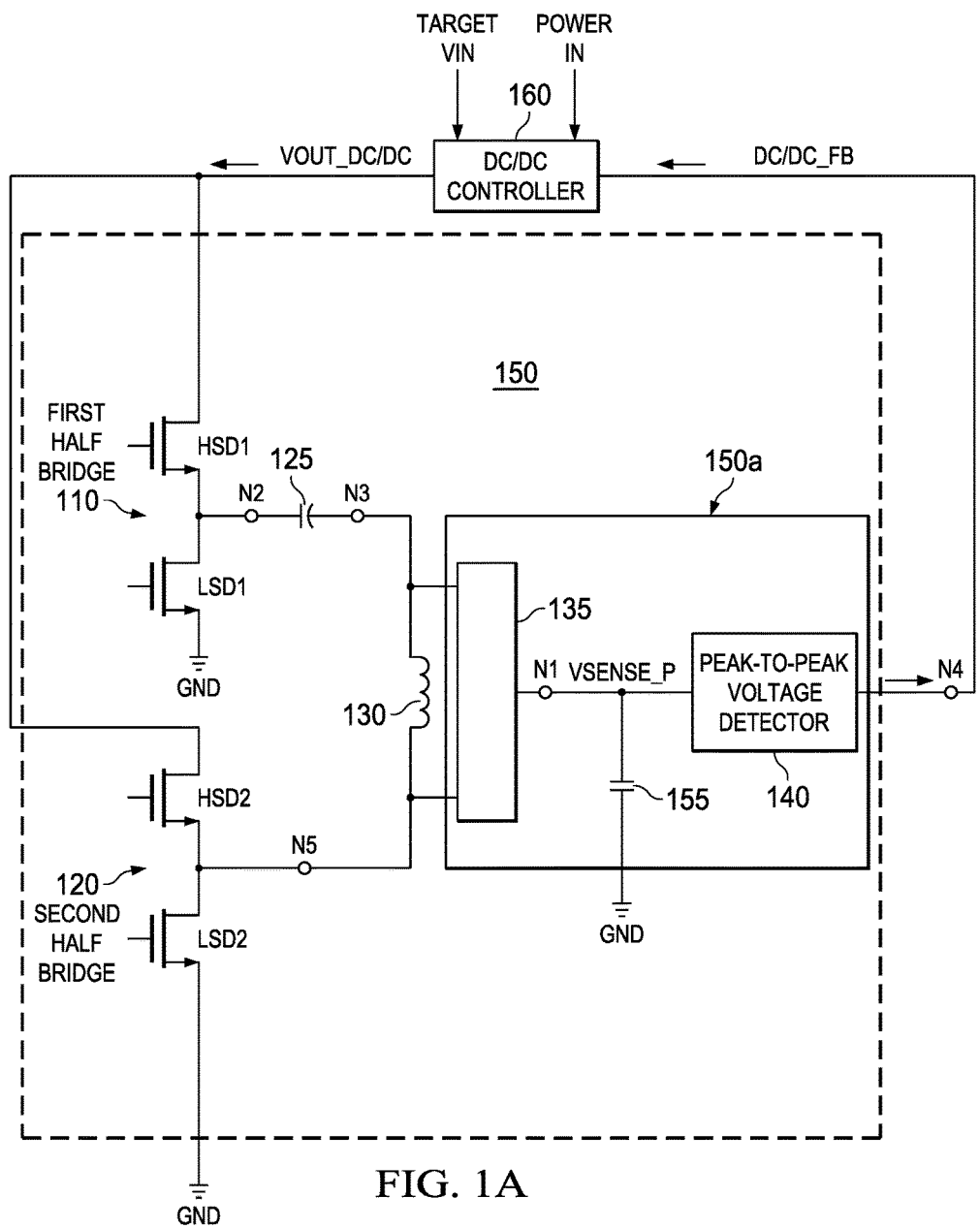
FIG. 1A depicts a disclosed wireless resonant power transmitter including an example peak voltage sensor in a feedback loop with a synchronous buck-boost DC/DC voltage controller between the peak voltage sensor that includes a summing block coupled across the terminals of the primary L and the high voltage power supply node for the half-bridges, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1A depicts a disclosed wireless resonant power transmitter 150 including an example peak voltage sensor 150a comprising a summing block 135 coupled across the high side terminal shown as N3 and the low side terminal shown as N5 of the primary L 130, where an output of the summing block 135 provides a summing voltage. The resonant power transmitter 150 also includes a peak-to-peak voltage detector 140 having an input coupled to an output of the summing block 135 shown as N1 in a feedback loop with a synchronous buck-boost DC/DC controller (DC-DC controller) 160 for regulating its output voltage at, above, or below the applied reference voltage shown as Vin target for a class-D amplifier comprising a first half-bridge 110 and a second half-bridge 120. The first half-bridge 110 is shown including HSD1 and LSD1 power MOSFET switches, and the second half-bridge 120 is shown including HSD2 and LSD2 power MOSFET switches. The target Vin is a voltage that is proportional to the target peak-to-peak voltage across the primary C 125.

Figure 1B:
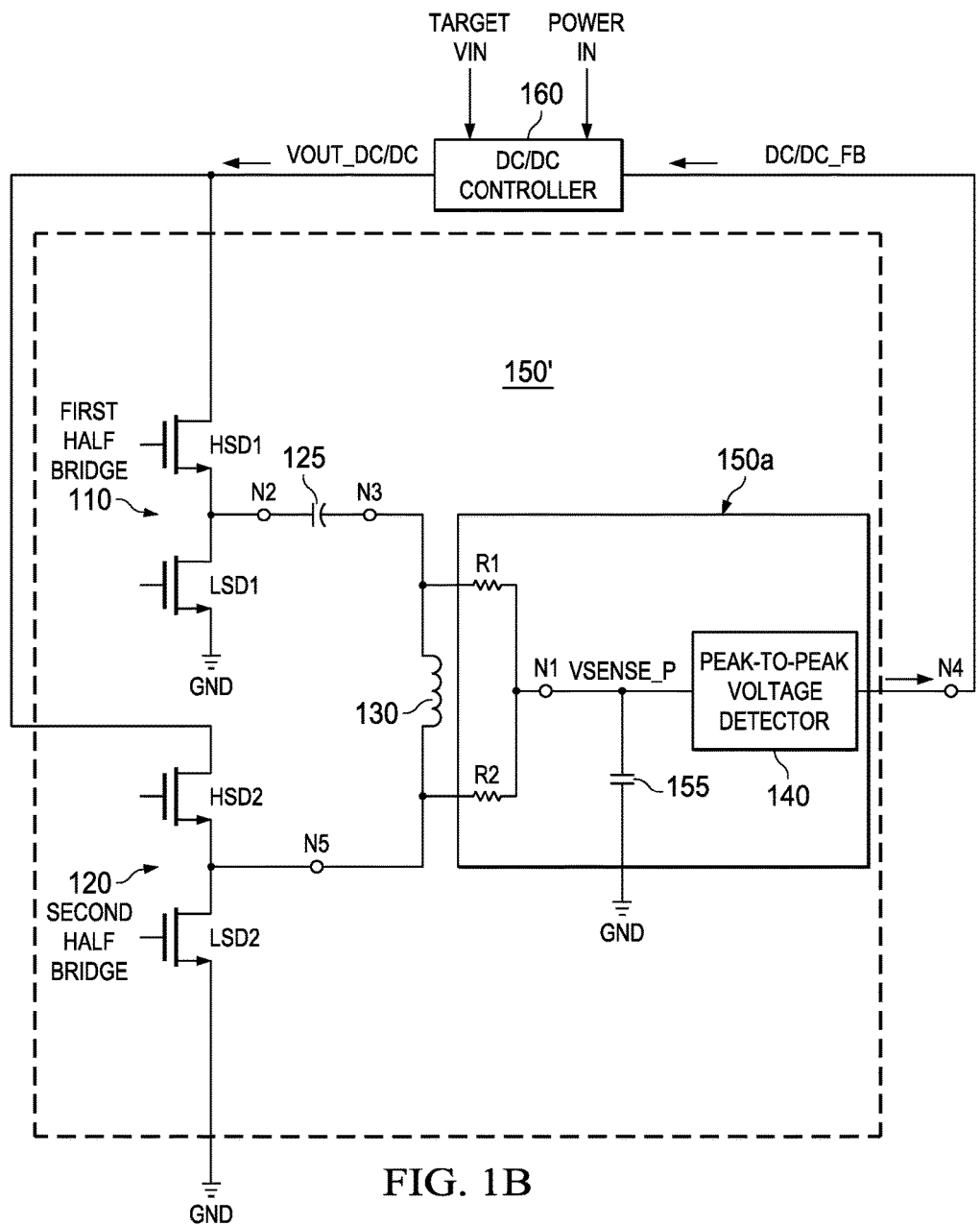
FIG. 1B depicts a disclosed wireless resonant power transmitter in FIG. 1A where the summing block is shown comprising a first resistor (R1) and a second resistor (R2) that are series connected having a center node that are in parallel to the primary L having the center node coupled to an input of a peak-to-peak voltage detector.

FIG. 1B depicts a disclosed wireless resonant power transmitter 150' based on the resonant power transmitter 150 shown in FIG. 1A with the only change being where the summing block 135 is now shown comprising a first resistor R1 and a second series connected resistor R2 that are in parallel to primary L 130 having its center node N1 coupled to the peak-to-peak voltage detector 140. R1 and R2 are generally equal, and may have a resistance value between 50 kohms and 500 kohms.

In order to obtain the voltage sum of the two ends (N3, N5) of the primary L 130, one can use a variety of different summing circuits. For example, one can use instrument amplifiers with a feedback resistor to a summing circuit. It is recognized a relatively simple way to build the summing circuit is by using two equal value resistors, where the voltage of middle point of the two resistors R1 and R2 (N1)=(VL1+VL2)/2, where VL1 is the voltage at the first end (N3) of primary L 130, and VL2 is the voltage at the second end (N5) of the primary L 130. By introducing another resistor R3 having a resistance value significantly lower (at least a factor of 2, but typically by at least a factor of 5) than R2 in parallel to R2 to the summing block (see the placement of R3 in FIG. 2 and FIG. 4A described below) due to the current divider formula the summing voltage at node N1 (between R1 and R2) can be reduced by at least a factor of 2, generally being reduced from dozens of volts to a lower voltage that thus can be only a few volts. It is recognized such voltage reduction is helpful because signal processing for a high speed signal at a level of dozens of volts is relatively difficult compared to the signal processing of a high speed signal having a level of only a few volts.

An optional filter capacitor 155 is shown in FIG. 1B positioned between N1 and ground. The 3 dB frequency of the filter capacitor 155 (with a parallel resistor, such as R3=2 kohms shown in FIG. 4A) should be about the same as, or slightly lower than the drive frequency (e.g., 6.78 MHz), so that it will not significantly reduce the signal amplitude after the filter capacitor 155, yet still be reasonably effective removing waveform glitches. Since the AC equivalent resistor at the filter capacitor 155 may be about 2 kohms, the value of the filter capacitor 155 should generally be about 25 pF. As known in the art, a 50% duty cycle beneficially provides 0 volt switching (thus higher power efficiency).

The first half-bridge 110 and second half-bridge 120 are each adapted to be driven by an oscillator that provides pulses and have their respective outputs coupled to drive the series resonant LC circuit including a primary L 130 and primary C 125. The high side terminal N3 and low side terminal N5 across the primary L 130 are adapted to be coupled to the summing block 135 (shown in FIG. 1A and R1 and R2 as the summing block as shown in FIG. 1B), where N1 (the output of the summing block 135 or the midpoint of R1 and R2) is coupled to an input of the peak-to-peak voltage detector 140. The output from the peak-to-peak voltage detector 140 at N4 shown as DC/DC_feedback (FB) is coupled to an input of the DC/DC controller 160. The DC/DC controller 160 adjusts its DC output voltage shown as Vout_DC/DC so that the voltage at N4 equals the target Vin also input to the DC/DC controller 160.

Figure 2:
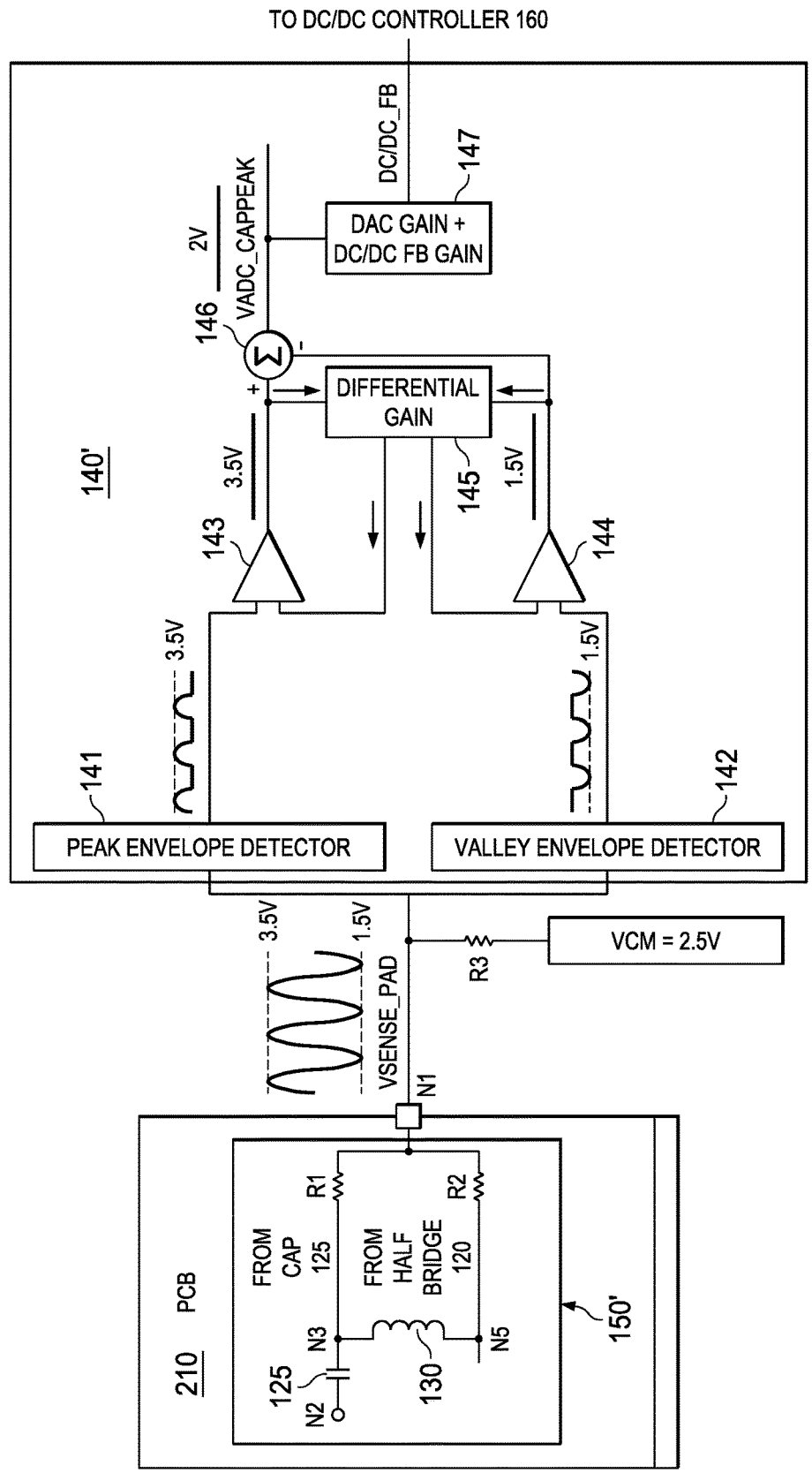
FIG. 2 is a block diagram depiction of an example peak-to-peak voltage detector, according to an example embodiment.

FIG. 2 is a block diagram depiction of an example peak-to-peak voltage detector shown as 140' that is again coupled to N1, according to an example embodiment. The primary C 125, primary L 130, and summing block shown as R1 and R2 in FIG. 1B is now shown collectively as 150' on a printed circuit board (PCB) 210. Not shown is the first half-bridge 110 and second half-bridge 120 that are adapted to be coupled to drive the series resonant circuit, or the driver for driving the half-bridges. An example waveform voltage at N1 is shown as a sinusoid with a DC offset ($V_{CM}$) of 2.5 V. It can be shown that the voltage at N1 ($V_{N1}$) is proportional to the voltage across the primary C ($V_{N2}$-$V_{N3}$) reflected in the equation shown below:

$$V_{N1}=(V_{N2}-V_{N3})(k)+V_{CM}$$

where $V_{N2}$-$V_{N3}$ is the voltage across the primary C 125, k is a constant set in FIG. 1B by the values of the resistors R1 and R2, and a common mode voltage $V_{CM}$=2.5 V is shown in FIG. 2 applied to N1 through R3. In the case the summing block further comprises R3 as shown in FIG. 2 (and in FIG. 4A), k=R3/(R1+2R3)=R3/(R2+2R3) when R1=R2 as it typically does. The CM voltage can be selected to keep the DC signal amplitude at N1 within a comfortably low range for envelop detection. The filter capacitor 155 has essentially no effect on DC performance, but may decrease the AC component of the voltage at N1 due to the filter effect. The filter capacitor 155 also introduces a phase shift that generally poses no operational problem.

Peak-to-peak voltage detector 140' includes a peak envelope detector 141 shown by example only outputting a peak envelope signal upside bounded by a 3.5 V level and valley envelope detector 142 shown outputting a valley envelope signal having a lowside bounded by a 1.5 V level. The output of the peak envelope detector 141 is coupled to a first input of a differential to single ended amplifier 143 and an output of the valley envelope detector 142 is shown coupled to a first input of a differential to single ended amplifier 144. The amplifiers 143, 144 are used to obtain a buffered DC output from the peak envelope detector 141 and valley envelope detector 142. The amplifiers 143, 144 can comprise instrument amplifiers having an active diode controlled by a Vds comparator to provide a fast comparator with a nS delay.

The outputs of the amplifiers 143 and 144 are coupled to respective inputs of a differential gain block 145 that has respective outputs coupled to a second input of amplifier 143 and a second input of amplifier 144. The outputs of the amplifiers 143 and 144 are also coupled to a summer 146 which removes the common mode level by subtracting the signal level at the output of amplifier 144 shown as 3.5 V from the signal level at the output of amplifier 143 shown as 1.5 V to provide a 2V DC output signal shown as VADC_CAPPEAK. The 2V DC output signal is shown coupled to a gain block 147 (see the example in FIG. 5 described below), which outputs the DC voltage signal that is proportional to a peak-to-peak voltage across the primary C 125 shown as a DC/DC_FB signal (also shown in FIG. 1A) which is coupled to an input of the DC/DC controller 160.

The peak envelope detector 141 and valley envelope detector 142 can each comprise a sample and hold circuit that only needs to include a reasonably fast (relative to the switching frequency) comparator, which is recognized to consume significantly less power as compared to a conventional fast amplifier. It is also recognized that a sample and hold circuit having a reasonably fast comparator can generally follow and thus sense the envelope of the peak and valley voltage, which changes relatively slowly compared to the switching frequency. The amplifiers 143, 144 can both be low power amplifiers for the needed low speed signal processing. Peak-to-peak voltage detector 140 thus provides the advantages of relatively simple circuitry and low power operation.

Figure 3:
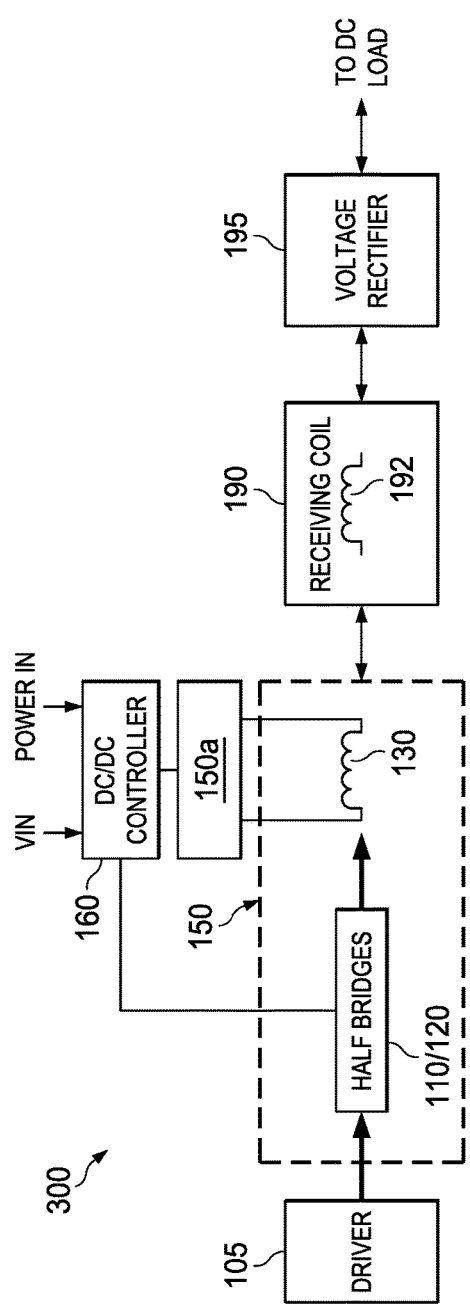
FIG. 3 shows an example wireless charging system including a disclosed wireless resonant power transmitter and a wireless resonant power receiver.

FIG. 3 shows an example wireless charging system 300 including a disclosed wireless resonant power transmitter 150 and a wireless resonant power receiver 190 having a receiving coil 192. A driver 105 is shown driving the first and second half-bridges 110, 120, and the output of the receiving coil 192 is shown coupled to a voltage rectifier 195 which provides a DC output for a DC load. As described above, the peak voltage sensor 150a is in a feedback loop with the DC/DC controller 160 which regulates its output voltage at, above, or below the applied input voltage shown as Vin target, to provide a supply voltage for the first half-bridge 110 and for the second half-bridge 120.

EXAMPLES

Disclosed embodiments are further illustrated by the following specific Examples, which should not be construed as limiting the scope or content of this Disclosure in any way.

Figure 4A:
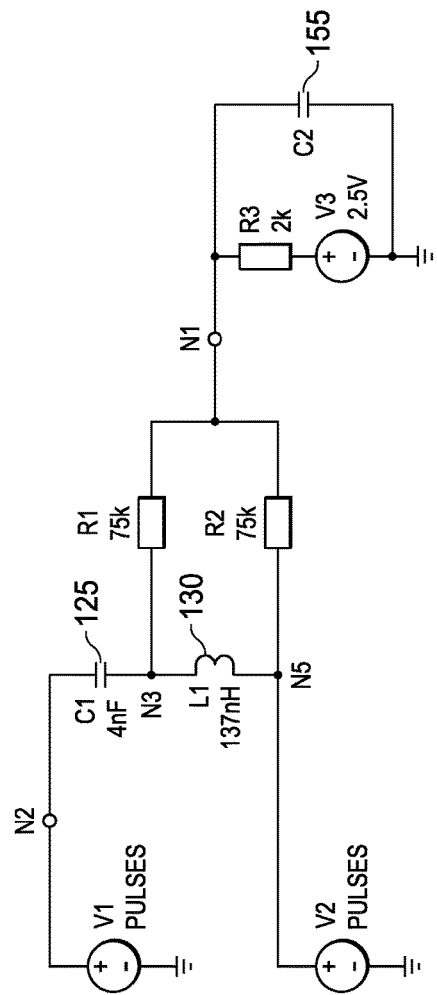
FIG. 4A shows the simulated circuit and conditions for the simulation being a differential class-D resonance driver driven at a frequency of 6.78 MHz with the high side of the resonant circuit receiving V1 pulses and the low side receiving V2 pulses.

A simulation was performed using the wireless resonant power transmitter 150' shown in FIG. 1B using about a 45% duty cycle. FIG. 4A shows the simulated circuit and conditions for the simulation being a differential class-D resonance driver driven at a frequency of 6.78 MHz with the high side of the resonant circuit receiving V1 pulses (representing the output voltage of the first half-bridge 110) and the low side receiving V2 pulses (representing the output voltage of the second half-bridge 120). A summing block comprising R1 and R2 both shown being 75 kohms were series connected having a center node N1 positioned in parallel to the primary L 130. The primary C 125 had a capacitance of 4 nF, and the primary L 130 had an inductance of 137 nH. An optional filter capacitor 155 is shown positioned between N1 and ground and a resistor R3 (shown as 2 kohms) is also shown coupled between N1 and a DC power supply identified $V_3$ which acts as an AC ground. R3 in this arrangement reduces the signal level at N1 by about a factor of 30. A common mode voltage of 2.5 V is shown applied to N1 through R3 by DC voltage source $V_3$.

Figure 4B:
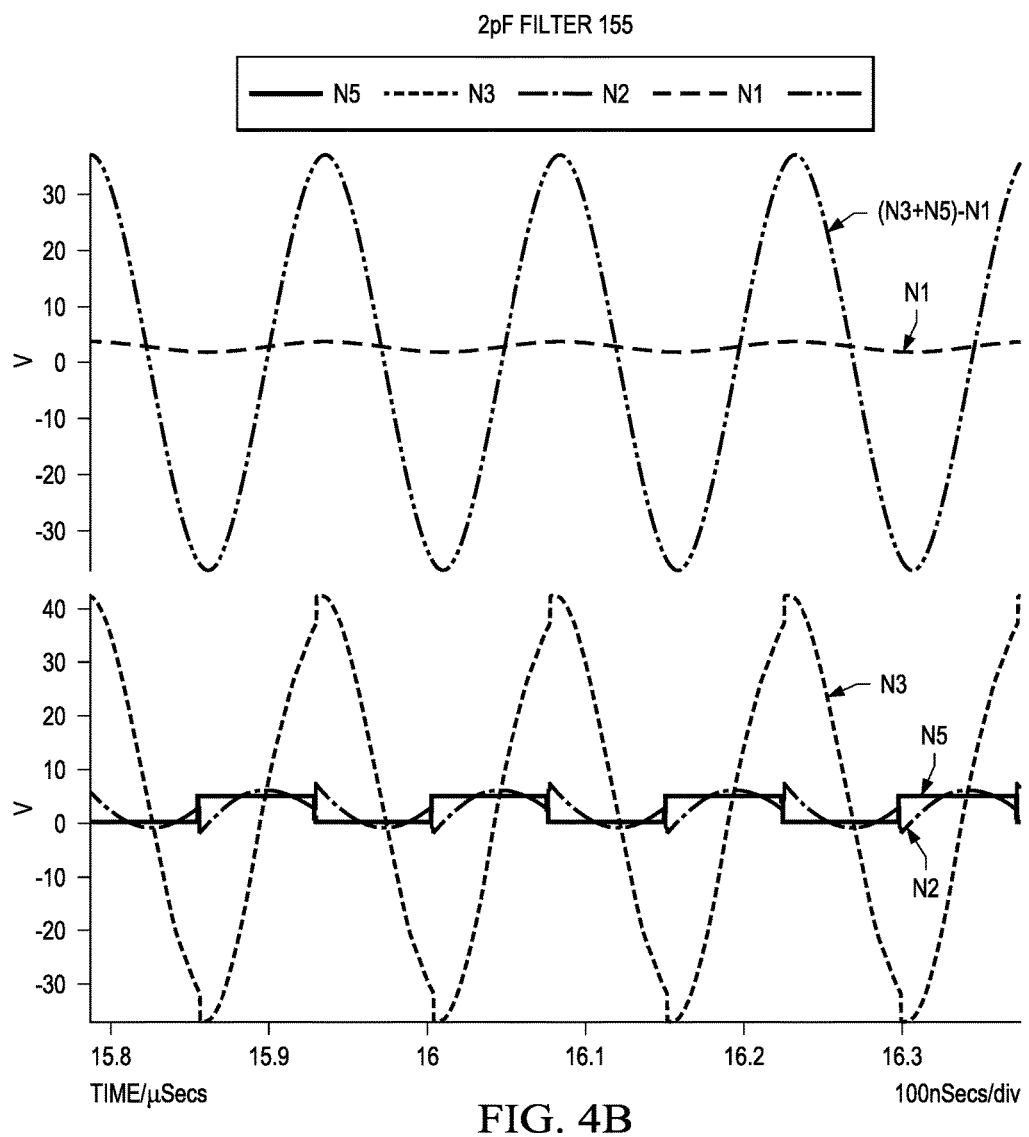

FIG. 4B shows voltage waveform data where the optional filter capacitor 155 had a capacitance of 2 pF. Voltage waveforms are shown at the top from N1, and (N3+N5)−N1 (the approximated voltage waveform across the primary C 125), and nodes N2, N3, and N5 on the bottom. The waveform for N5 is a square wave. Although N2 and N3 (across the primary C 125) both clearly have waveform jumps, the waveform shown as N3+N5−N1 can be seen to be essentially a pure sinusoidal waveform.

Figure 4C:
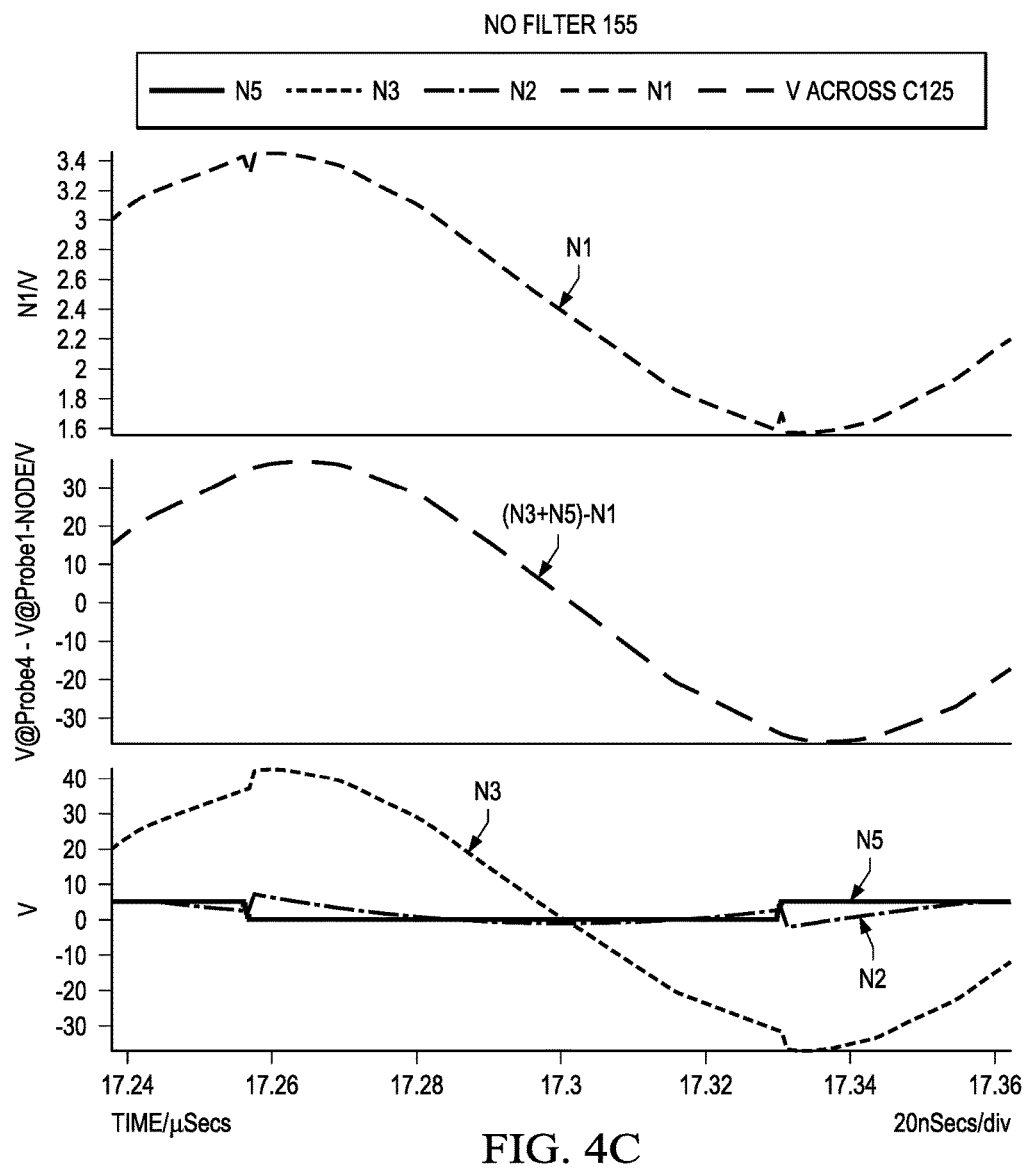
FIG. 4C shows voltage waveform data where there was no optional filter capacitor.

FIG. 4C shows waveform data where there was no optional filter capacitor 155. Waveforms are shown from N1, N2, N3, N5 and the voltage across the primary C 125 again approximated by the voltage at N3+N5−N1. The waveform at N1 is seen to include a distortion near the peak and near the trough, but the approximated voltage waveform across the primary C 125 (N3+N5−N1) is seen to be distortion-free.

Figure 5:
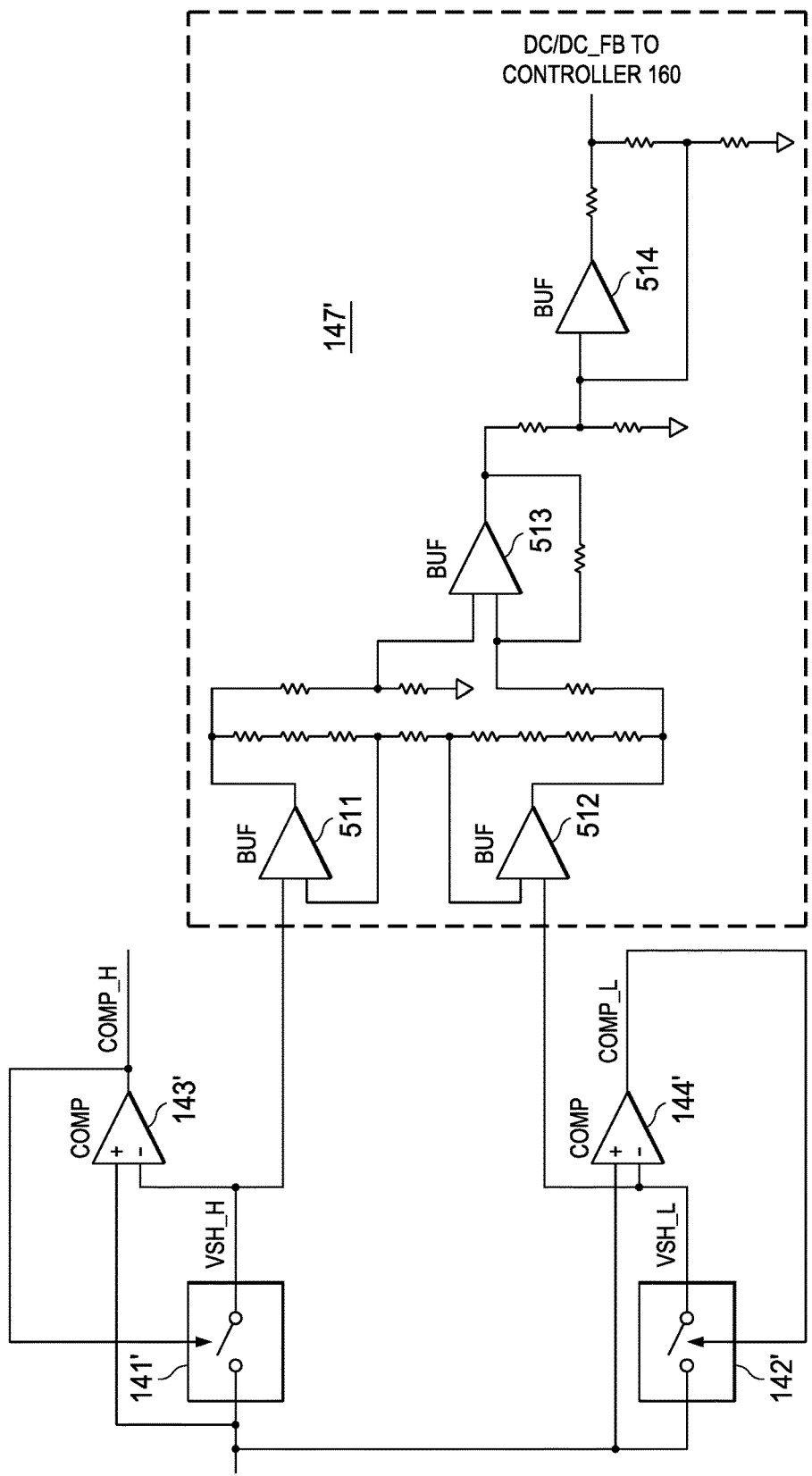
FIG. 5 shows an example circuit realization for peak detection comprising a peak envelope detector coupled to a comparator, and for valley detection comprising a valley envelope detector coupled to a comparator, where the outputs from the envelope detectors are coupled to an example circuit for realizing the gain block shown in FIG. 2.

FIG. 5 shows an example circuit realization for peak detection comprising a peak envelope detector 141' coupled to a comparator 143', and for valley detection comprising a valley envelope detector 142' coupled to a comparator 144'. The outputs from the envelope detectors shown as VSH_H and VSH_L are coupled to an example circuit for realizing the gain block 147 shown in FIG. 2 now shown as 147' in FIG. 5 including buffers (shown as BUF) 511, 512, 513 and 514 and associated circuitry shown in simplified form as a network of resistors.

Applications for disclosed embodiments include inductive or magnetic charging and power in a wide variety of applications. For example, usage in mobile, electronic, electric, lighting, batteries, power tools, kitchen, industrial, medical or dental, military applications, vehicles, robots, or trains.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The invention claimed is:

1. A wireless power circuit comprising:
   (a) a series resonant circuit including a primary capacitor and an inductor coupled in series, the primary capacitor having first and second terminals and the inductor having first and second terminals, a first terminal of the inductor being coupled to a second terminal of the primary capacitor;
   (b) a first half-bridge circuit having a terminal coupled to the first terminal of the capacitor;
   (c) a second half-bridge circuit having a terminal coupled to the second terminal of the inductor;
   (d) a summing circuit having a first summing terminal coupled to the first terminal of the inductor, a second summing terminal coupled to the second terminal of the inductor, and a center node terminal; and
   (e) a peek-to-peek voltage detector having an input coupled to the center node terminal of the summing circuit and having a voltage detector output.

2. The wireless power circuit of claim 1 in which the summing circuit includes a first resistor coupled between the first summing terminal and the center node terminal, and a second resistor coupled between the center node terminal and the second summing terminal.

3. The wireless power circuit of claim 2 in which the first resistor and the second resistor have equal resistances.

4. The wireless power circuit of claim 2 including a filter capacitor coupled between the center node terminal and a circuit ground.

5. The wireless power circuit of claim 2 including:
   (a) a third resistor having a first terminal coupled to the center node terminal and a second terminal, the third resistor having a resistance less than a resistance of the second resistor; and
   (b) a DC power supply having a supply terminal coupled to the second terminal of the third resistor and a ground terminal coupled to a circuit ground.

6. The wireless power circuit of claim 5 in which the DC power supply provides a DC voltage of 2.5 volts at the supply terminal.

7. The wireless power circuit of claim 1 in which the peak-to-peak voltage detector includes:
   (a) a peak envelope detector sample and hold circuit having an input coupled to the center node; and
   (b) a valley envelope detector sample and hold circuit having an input coupled to the center node.

8. The wireless power circuit of claim 7 in which the peak envelope detector sample and hold circuit includes comparators and the valley envelope detector sample and hold circuit includes comparators.

9. The wireless power circuit of claim 1 including a DC to DC controller having an input coupled to the voltage detector output, a power in input, a target voltage input, and a voltage output coupled to the first half-bridge circuit and to the second half-bridge circuit.

10. A process of peak-to-peak detection comprising:
    (a) applying voltage pulses to a serial coupled primary capacitor and inductor;
    (b) summing voltages from across the inductor to provide a summing output signal at a center node; and
    (c) processing the summing output signal to generate a DC voltage signal that is proportional to a peak-to-peak voltage across the primary capacitor.

11. The process of claim 10 in which the applying voltage pulses includes applying a power supply voltage to a first half-bridge coupled to the primary capacitor and to a second half-bridge coupled to the inductor.

12. The process of claim 11 including controlling the power supply voltage to the first and second half-bridges with a DC to DC controller in response to the generated DC voltage signal.

13. The process of claim 10 in which the processing includes extracting a peak envelope signal and a valley envelope signal from the summing output signal with sample and hold circuits that include comparators.

14. The process of claim 10 in which the summing voltages from across the inductor includes summing voltages with a first resistor coupled between one terminal of the inductor to the center node and a second resistor coupled between another terminal of the inductor and the center node.

15. The process of claim 14 in which the resistances of the first resistor and the second resistor are equal.

16. The process of claim 14 including reducing a voltage of the summing output signal with a third resistor coupled between the center node and a circuit ground, the third resistor having a resistance less than a resistance of the second resistor.

17. The process of claim 16 including applying a common mode voltage to between the third resistor and the circuit ground.

18. The process of claim 10 including filtering the summing output signal with a filter capacitor coupled between the center node and a circuit ground.

* * * * *